(12) United States Patent
Catley et al.

(10) Patent No.: US 6,600,819 B1
(45) Date of Patent: Jul. 29, 2003

(54) METHOD FOR IMPLEMENTING CALL ACCEPTANCE GROUPS IN A COMMUNICATION NETWORK

(75) Inventors: Ian Catley, München (DE); Georg Mayer, Miesbach (DE); Robert Stampfl, Hohenkammer (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/465,727

(22) Filed: Dec. 17, 1999

(30) Foreign Application Priority Data

Dec. 17, 1998 (EP) .............................. 98124029

(51) Int. Cl.[7] .................................. H04M 3/42
(52) U.S. Cl. ................... 379/205.1; 379/211.04; 379/211.03
(58) Field of Search .................. 379/211.04, 187; 370/261

(56) References Cited

U.S. PATENT DOCUMENTS 5,454,032 A  9/1995  Pinard et al.
5,802,160 A * 9/1998 Kugell et al. ............. 370/261

FOREIGN PATENT DOCUMENTS

EP       0549126 A2    6/1993

OTHER PUBLICATIONS

Published International Application No. 97/50234 (Mukerjee et al.), dated Dec. 31, 1997.
Published International Application No. 94/29992 (Bannister et al.), dated Dec. 22, 1994.

* cited by examiner

Primary Examiner—Ahmad F. Matar
Assistant Examiner—Karen Le
(74) Attorney, Agent, or Firm—Laurence A. Greenberg; Werner H. Stemer; Gregory L. Mayback

(57) ABSTRACT

A method is provided for implementing call acceptance groups extending between network nodes in a communications network having a plurality of network nodes. An arrival of a call for a terminal which is coupled to a first network node and has an assigned call acceptance group is also signaled to all of the other network nodes that are to be determined and to which terminals of the call acceptance group are coupled. The network nodes subsequently cause that information to be displayed at the terminals of the call acceptance group which are coupled to the network nodes, and permit the call to be accepted at each of those terminals.

10 Claims, 2 Drawing Sheets

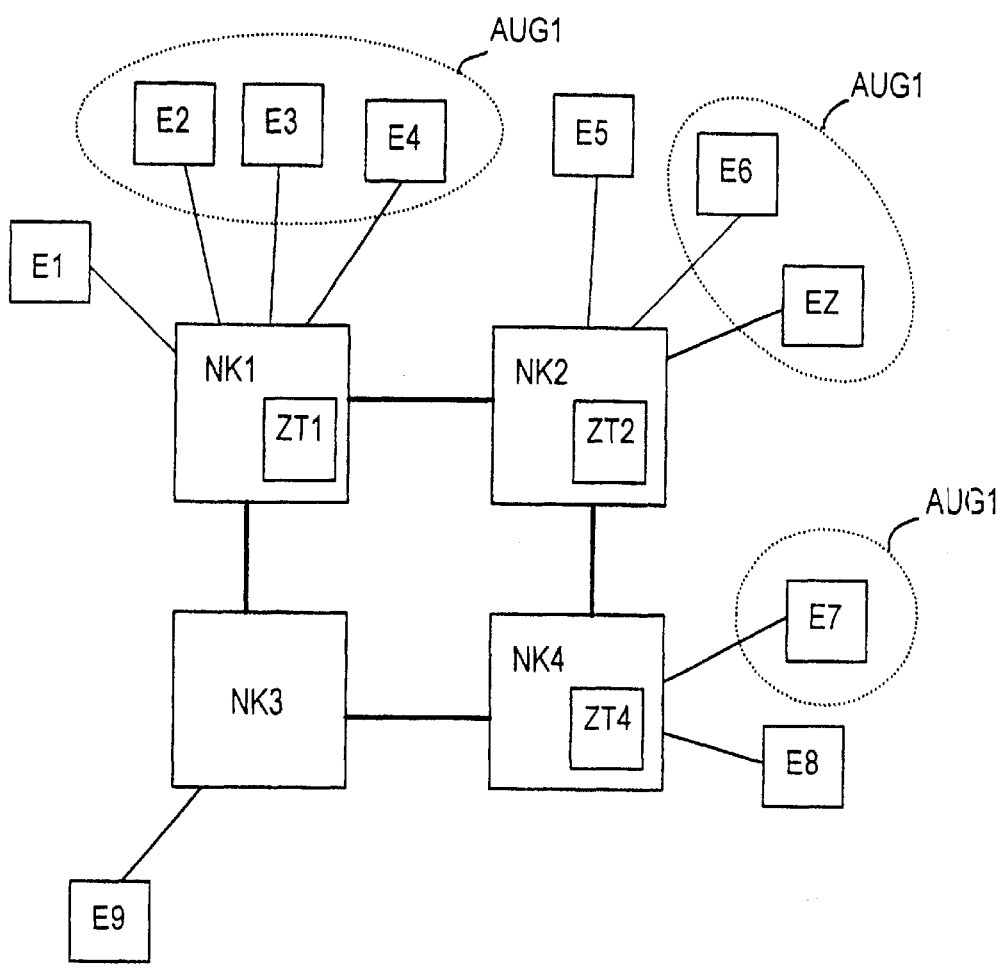

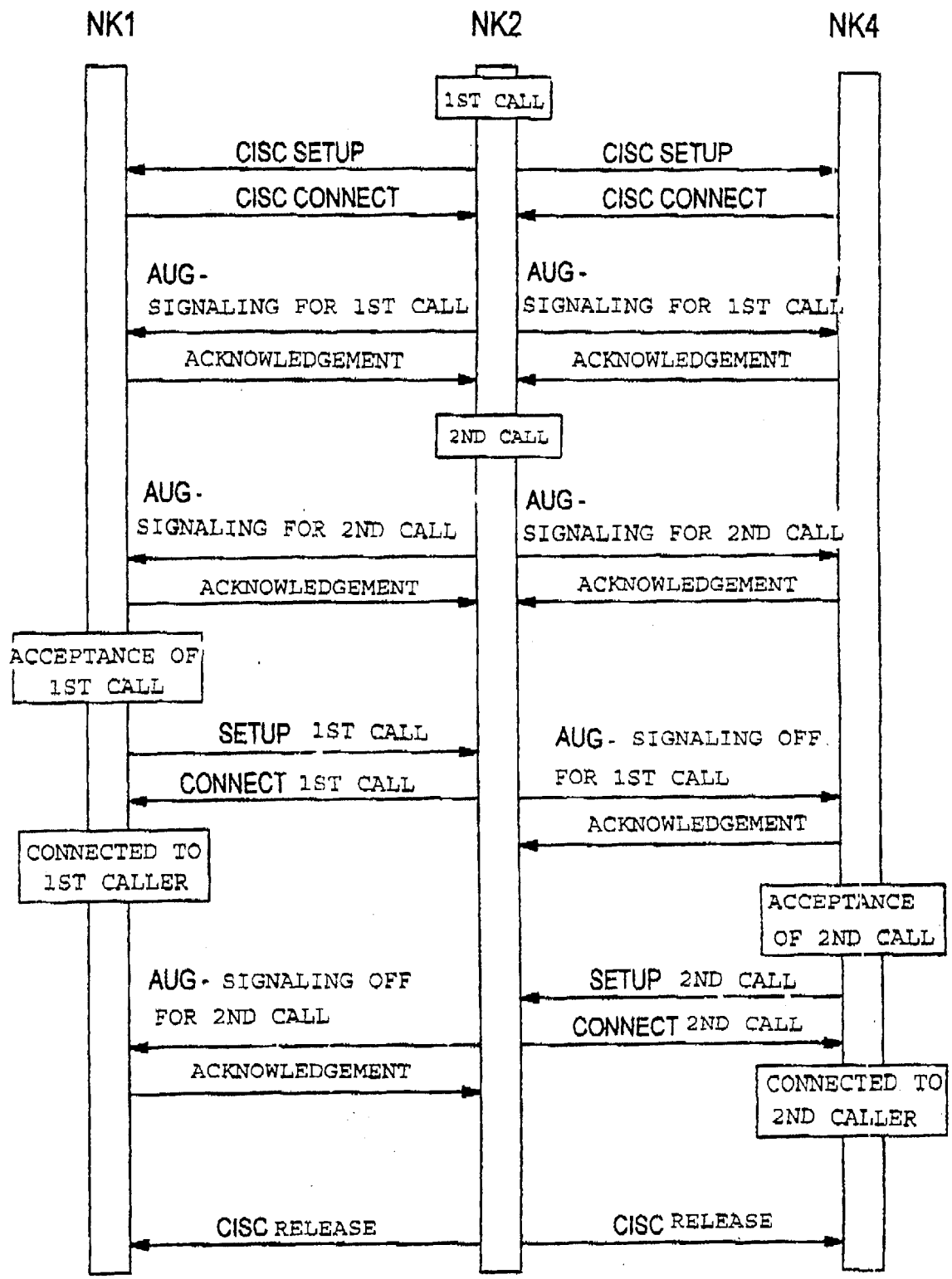

METHOD FOR IMPLEMENTING CALL ACCEPTANCE GROUPS IN A COMMUNICATION NETWORK

BACKGROUND OF THE INVENTION

Field of the Invention

The invention relates to a method for implementing call acceptance groups in a communications network having a plurality of network nodes.

In many contemporary switching devices, terminals which are connected to them can be combined to form a so-called call acceptance group. That serves the purpose of enabling calls which are directed to any desired terminal of such a call acceptance group to also be accepted by any other terminal of that call acceptance group. For that purpose, the arrival of a call directed to a terminal of the call acceptance group is also displayed at the other terminals of the call acceptance group. After a call acceptance key or the like has been activated at one of the terminals of the call acceptance group, the call is connected through to the terminal by the switching device.

Such a performance feature is made available, for example, by the switching device HICOM 300 E, Version 2.0 from Siemens AG which is commercially available.

A restriction of the previously known methods for implementing such call acceptance groups is that a call acceptance group can include only terminals which are connected to the same switching device.

SUMMARY OF THE INVENTION

It is accordingly an object of the invention to provide a method for implementing call acceptance groups, which overcomes the hereinafore-mentioned disadvantages of the heretofore-known methods of this general type, which is more flexible and with which the restriction explained above can be overcome.

With the foregoing and other objects in view there is provided, in accordance with the invention, a method for implementing call acceptance groups in a communications network having a plurality of network nodes, which comprises after an arrival of a call for a called terminal coupled to a first network node, determining another network node coupled to at least one terminal assigned to the called terminal as a call acceptance group; transferring a signaling information item, for identifying the call acceptance group terminals coupled to the other network node, from the first network node to the other network node; subsequently causing, with the other network node, an indicator information item, referring to a possibility of the call being accepted, to be displayed at the call acceptance group terminals coupled to the network node; signaling an acceptance of the call, at a call acceptance group terminal coupled to the other network node, through the other network node to the first network node; and subsequently connecting the call, held at the first network node, through to the terminal.

The method according to the invention can be used to assign to a terminal a call acceptance group which includes not only terminals that are connected to the same network node but also terminals which are connected to any other network nodes of the communications network. In this case, the field of application of the method is not restricted to a specific type of network node, for example switching stations, but rather extends to any desired network nodes of a communications network with connected terminals, for example to mobile radio base stations as well.

The assignment of a call acceptance group to a terminal can be determined by the association of this terminal with a definable group of terminals. In this case, each terminal of this group is assigned the same call acceptance group, to be precise the group itself. This has the advantage of ensuring that a call acceptance group can very easily be formed or changed by storing the respective terminal identifiers in a table contained in the network nodes in question.

An alternative is that each terminal of a call acceptance group which is assigned to a first terminal can be assigned its own call acceptance group. The call acceptance group does not need to correspond to the call acceptance group which has been assigned to the first terminal. As a result, a more complex configuration is possible with this alternative. In particular, a terminal can then be included in a plurality of different call acceptance groups.

In accordance with another mode of the invention, the signaling information and/or the information relating to the acceptance of the call can be transferred through a connection which has been set up between the network nodes for this purpose, preferably a signaling connection, for example CISC (Call Independent Signaling Connection). In this context, a connection setup can be initiated by an incoming call.

In accordance with a further alternative mode of the invention, the information which is to be transmitted can also be transferred through an already existing connection. As a result, a time-consuming new setup of a connection is avoided.

In this context it is advantageous if a connection between the network nodes which is used for transferring the signaling information and/or the information relating to the acceptance of a call is not released again until after a predefinable time period since the acceptance of a call. In this way, the same connection can be used for the signaling of further calls which arrive during this time period.

With a channel-oriented connection, the signaling information and/or the information relating to the acceptance of a call can advantageously be transmitted within a signaling channel, for example the D channel of an ISDN connection.

In accordance with a concomitant mode of the invention, call-specific information is also transferred to the other network node, together with the signaling information. In this way, it is possible, for example, to transfer the call number and/or the name of the calling and/or called subscriber to the further network node so that it can be displayed at the terminals of the call acceptance group which are coupled to this network node.

Other features which are considered as characteristic for the invention are set forth in the appended claims.

Although the invention is illustrated and described herein as embodied in a method for implementing call acceptance groups in a communications network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of a communications network having a plurality of network nodes and terminals connected thereto;

FIG. 2 is an illustration of assignment tables contained in the network nodes, for assigning terminals and network nodes to call acceptance groups; and FIG. 3 is a sequence chart of signaling traffic between network nodes.

DESCRIPTION OF THE PREFERRED EMBODIMENTS

Referring now to the figures of the drawings in detail and first, particularly, to FIG. 1 thereof, there is seen a block diagram of a communications network with four network nodes NK1, . . . ,NK4 which are networked to one another, and terminals EZ, E1, . . . ,E9 that are connected thereto. The terminals E1, . . . ,E4 are connected in this case to the network node NK1, the terminals EZ, ES, E6 are connected to the network node NK2, the terminal E9 is connected to the network node NK3, and the terminals E7, E8 are connected to the network node NK4. The terminals E2, E3, E4, E6 and E7 are included in a call acceptance group AUG1 which extends between network nodes and is assigned to the network terminal EZ. In this case, the terminal EZ is to be considered as also belonging to this call acceptance group AUG1. Calls which are directed to the terminal EZ are thus to be displayed at all of the terminals which belong to the call acceptance group AUG1 of the terminal EZ, with the possibility of accepting these calls at each of these terminals. In order to assign terminals and network nodes to call acceptance groups, the network nodes NK1, NK2 and NK4 also each contain an assignment table ZT1, ZT2 and ZT4, for example in the form of a memory area, which is provided for this purpose.

FIG. 2 illustrates a data content of these assignment tables ZT1, ZT2 and ZT4. All of the call acceptance groups AUG1, AUG2, . . . which relate to the respective network node NK1, NK2 or NK4 are entered for each network node NK1, NK2 or NK4 in the assignment table ZT1, ZT2 or ZT4 which is respectively contained in the node. In this case an entry of a call acceptance group is assigned an entry for each terminal which belongs to this call acceptance group and is connected to the respective network node, as well as an entry for each further network node to which other terminals of this call acceptance group are connected. The table entries are composed of an information item which identifies the respective call acceptance group and of the identifiers of the assigned terminals or network nodes. The terminals of a call acceptance group which can be connected to a network node are thus designated directly by the table entry assigned to the call acceptance group. The other terminals of this call acceptance group are determined indirectly through the use of references to the respective other network nodes or their assignment tables into which these other terminals are then entered.

Since the structure of a call acceptance group is determined by the entries in the assignment tables, a call acceptance group can easily be formed or changed by entries in this table.

When a call is received for the terminal EZ which is connected to the network node NK2, the network node NK2 firstly searches through the assignment table ZT2 for the identifier of this terminal EZ. If this search is not successful, the incoming call would be ultimately signaled to the terminal EZ and could also be accepted there. However, in the present example, the identifier of the terminal EZ is found in the assignment table ZT2, which is assigned to the call acceptance group AUG1, after which a process of signaling the call to all of the terminals of the call acceptance group AUG1 is initiated. For this purpose, firstly the identifiers of terminals E6 and EZ of the call acceptance group AUG1 which are connected directly to the network node NK2 are read out from the assignment table ZT2, and a process of signaling the call to these two terminals E6, EZ is brought about. Furthermore, the identifiers of the network nodes NK1 and NK4 which are assigned to this call acceptance group AUG1 are read out of the assignment table ZT2 and in each case a signaling connection is set up between the network nodes NK1, NK4 and the network node NK2. In the process, a so-called CISC signaling connection (Call Independent Signaling Connection) is preferably set up. The connection is made available by a large number of communications systems as a possible way of exchanging signaling information in a call-independent manner. The signaling is carried out in this case through the use of the so-called D channel, for example in accordance with the ETSI standard definition for signaling QSIG for private networks or DSS1 for public networks or other ITU-T standard definitions.

FIG. 3 shows a sequence chart of signaling traffic through the signaling connections between the network node NK2 and the network nodes NK1 and NK4. The signaling connections are set up after the arrival of the call which is referred to below as a first call, in such a way that in each case a connection setup message (CISC Setup) is transmitted from the network node NK2 to the network nodes NK1 and NK4 and is acknowledged by an acknowledgement signal (CISC CONNECT) from the network nodes NK1 and NK4.

Subsequently, the network node NK2 signals to the network nodes NK1 and NK4, through the signaling connections which have been set up. This is done by transferring a signaling information item (AUG signaling information item) which identifies the call acceptance group AUG1. The transfer of the signaling information item is preferably carried out in this case within so-called facility information elements. Call-specific information, such as the name and/or the telephone number of the calling and/or called subscriber, are additionally transferred together with the signaling information. The reception of the signaling information for the first call is in turn acknowledged by the network nodes NK1 and NK4.

After reception of the signaling information which identifies the call acceptance group AUG1, in each case the identifiers of the terminals E2, E3 and E4, E7 which are assigned to the identified call acceptance group AUG1 are read out of the assignment table ZT1 or ZT4 by the network nodes NK1 and NK4. The arrival of the first call is then signaled to the terminals E2, E3, E4 and E7 which have been determined in this way, by the respective appropriate network node NT1 or NT4.

This signaling and the signaling described above to the terminals E6 and EZ takes place in such a way (using QSIG protocol) that the arrival of the first call is displayed at each of the terminals E2, E3, E4, E6, E7 and EZ, and the possibility of accepting this call at each of these terminals is provided. The arrival of the first call is displayed in this case at the terminals E2, E3, E4, E6, E7, EZ through the use of an audible and/or visual signal, for example through the use of a ringing tone and/or lighting up an LED on a call acceptance key. Furthermore, call-specific information such as the name and/or the telephone number of the calling and/or called subscriber is also transferred to these terminals or to a selection of them and displayed, if they have an appropriate display facility.

In the present exemplary embodiment, a second call for the terminal EZ arrives after the signaling of the first call.

The second call essentially initiates the same above-described method steps as the first call, with the exception that there is no time-consuming re-establishment of a signaling connection. The transfer and acknowledgement of the signaling information item (AUG signaling information item) which identifies the call acceptance group AUG1 is instead carried out for the second call through the use of the already existing signaling connections between the network node NK2 and the network nodes NK1, NK4.

After the signaling of the second call to the terminals E2, E3, E4, E6, E7 and EZ of the call acceptance group AUG1 has taken place, in the present exemplary embodiment the first call is accepted at the terminal E2 which is connected to the network node NK1. Consequently the network node NK1 transfers a request (Setup) for the transfer of the first call, which is held at the network node NK2, through the existing signaling connection to the network node NK2, after which the first call is connected through to the terminal E2 through the network node NK1. A service feature "path replacement" which is accessible by using the QSIG protocol can preferably be used in this case in order to produce a direct connection between the first caller and the terminal E2 without a detour through the network node NK2.

When the first call is connected through, the display at the terminals E3, E4 which relates to this call is switched off by the network node NK1, and it is switched off at the terminals E6, EZ by the network node NK2. For the same purpose, a switch-off information item (AUG signaling off) which identifies the call acceptance group AUG1 for the first call, is transferred to the network node NK4. The information item causes this network node NK4 to switch off the respective display at the terminal E7. This is in turn acknowledged by the network node NK4.

Finally, in the present exemplary embodiment, the second call is accepted at the terminal E7, which in turn leads to the second call being connected through to this terminal E7 and the display which relates to the second call at all of the other terminals E2, E3, E4, E6 and EZ of the call acceptance group AUG1 being switched off. The exchange of signaling information between the network nodes is also carried out in this case through the use of the already existing signaling connections.

After the acceptance of the last (in this case the second) held call, a timer is started so that the signaling connections are not released until after a predefinable time period has expired. The delayed release of the signaling connections allows them to be used for the signaling of further calls which may possibly arrive during this time period. In such cases, time-consuming re-establishment of these signaling connections is not necessary.

We claim:

1. In a method for implementing call acceptance groups in a communications network having a plurality of network nodes, the improvement which comprises:
    a) after an arrival of a call for a called terminal coupled to a first network node, determining another network node coupled to at least one terminal assigned to a call acceptance group of the called terminal;
    b) transferring a signaling information item, for identifying the call acceptance group terminals coupled to the other network node, from the first network node to the other network node;
    c) subsequently causing, with the other network node, an indicator information item, referring to a possibility of the call being accepted, to be displayed at the call acceptance group terminals coupled to the other network node;
    d) signaling an acceptance of the call, at a call acceptance group terminal coupled to the other network node, through the other network node to the first network node; and
    e) subsequently connecting the call, held at the first network node, through to the terminal.

2. The method according to claim 1, which comprises carrying out the step of transferring the signaling information item through a call-independent signaling connection set up for that purpose between the first network node and the other network node.

3. The method according to claim 2, which comprises initiating the setup of the connection with the incoming call.

4. The method according to claim 2, which comprises signaling the acceptance of the call to the first network node through the set up connection.

5. The method according to claim 2, which comprises releasing the set up connection after a predefinable time period has expired since the acceptance of the call.

6. The method according to claim 1, which comprises signaling between network nodes in order to switch off the display of the indicator information item at the terminals of the call acceptance group, when the call is accepted at a terminal of the call acceptance group.

7. The method according to claim 1, which comprises additionally transferring call-specific information to the other network node to be displayed at a call transfer group terminal coupled to that network node, together with the signaling information item.

8. The method according to claim 1, which comprises:
    storing, in the first network node, a network node assignment table for assigning the other network node and at least a further network node to the called terminal coupled to the first network node, the further network node having coupled thereto at least one terminal belonging to the call acceptance group of the called terminal; and
    determining the other network node by accessing the network node assignment table stored in the first network node.

9. The method according to claim 1, which comprises determining a terminal of the call acceptance group, at which the indicator information item is to be displayed, by accessing a terminal assignment table in the first network node, assigning another terminal belonging to its call acceptance group to a terminal coupled to the first network node, in the terminal assignment table, and transferring a signaling information item, identifying the determined call acceptance group terminal, from the first network node to the other network node.

10. The method according to claim 1, which comprises transferring a signaling information item identifying the call acceptance group from the first network node to the other network node, and subsequently determining, with the other network node, the terminals of that call acceptance group coupled to it, by accessing an assignment table in which a call acceptance group is assigned the terminals belonging to that call acceptance group and coupled to the other network node.

* * * * *